Patented Nov. 5, 1940

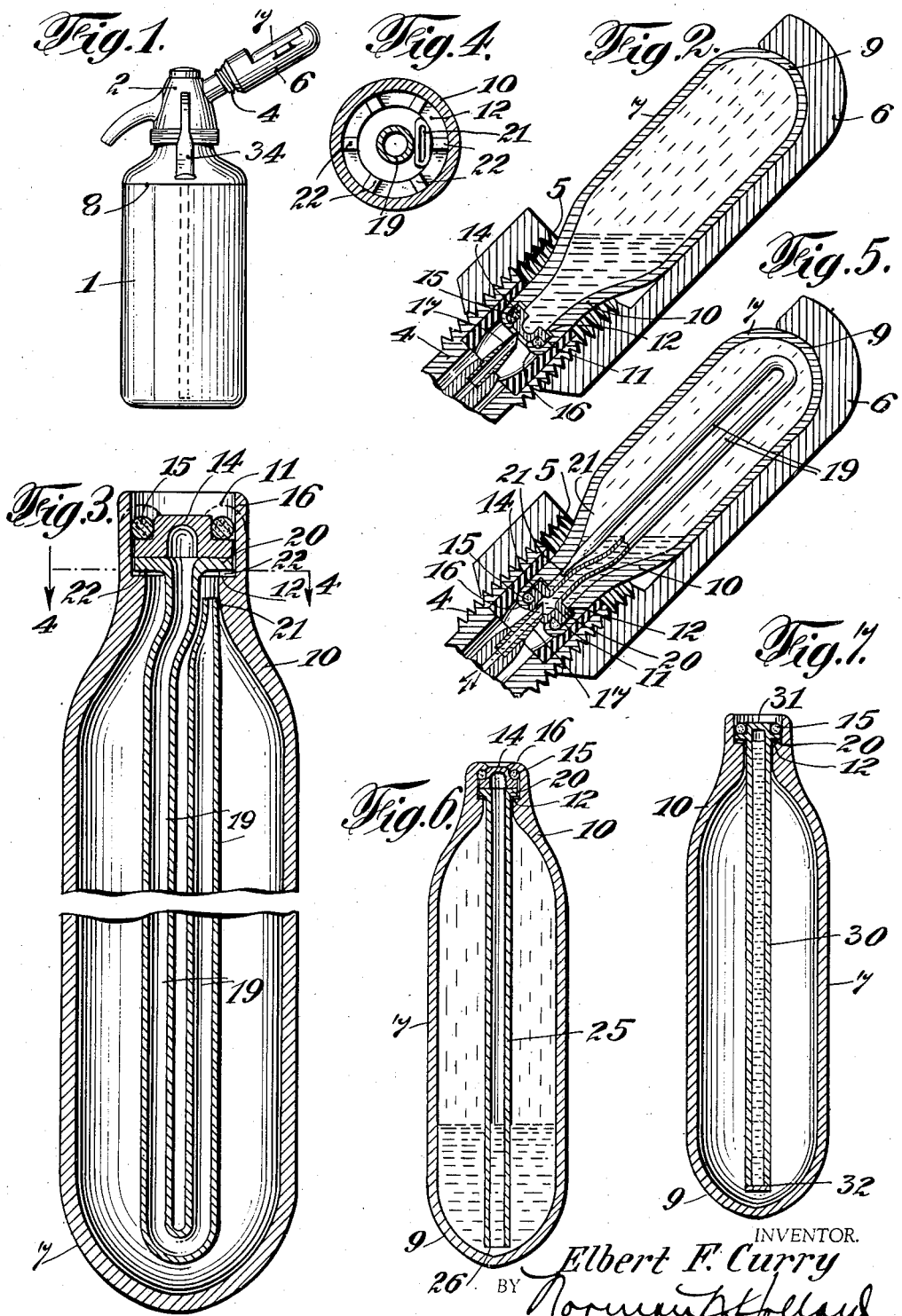

2,220,146

UNITED STATES PATENT OFFICE 2,220,146

DEVICE AND METHOD FOR CHARGING SIPHON BOTTLES

Elbert F. Curry, Long Island City, N. Y.

Application February 19, 1937, Serial No. 126,550

10 Claims. (Cl. 225—22)

The present invention relates to siphon bottles and the like, and more particularly to a bulb or capsule and method for preparing flavored carbonic beverages in siphon bottles.

Siphon bottles adapted to be charged by the consumer at home to provide carbonated water, have become very popular since the sale and consumption of spirituous liquors has again been legalized. However, many people do not like the taste of plain carbonated or charged water but instead prefer to use a sweetened or flavored carbonic beverage such as ginger ale, lemon soda or the like for a "mixer" or "chaser." In such cases, the consumers cannot enjoy the economy and the convenience of making their own carbonic beverages, but must purchase the beverages in bottles. This puts the consumer to the inconvenience of carrying home heavy packages, paying a cash deposit on the bottles, and returning the empty bottles to the stores.

The present invention aims to provide a novel bulb or capsule and method for charging soda siphons and the like with compressed carbon dioxide gas and flavoring material to prepare carbonic beverages such as ginger ale, sarsaparilla, lemon, lime or orange soda or the like, and thus enable the consumer to prepare flavored beverages at home. The invention further aims to provide a bulb containing a predetermined amount of flavoring material which, when mixed with a predetermined volume of water, will form a beverage containing the proper portion of ingredients and having a predetermined taste.

An object of the present invention is to provide a novel bulb or capsule containing compressed gas and flavoring material for charging soda siphons or the like.

Another object of the invention is to enable consumers to readily prepare flavored carbonic beverages inexpensively at home.

Another object of the invention is to provide bulbs for preparing carbonic beverages having any desired flavor.

Another object of the invention is to reduce the cost of flavored carbonic beverages and to effect a saving for the consumer.

Another object of the invention is to provide simple inexpensive bulbs for preparing flavored carbonic beverages which, after being used, are discarded, thus eliminating the unsanitary method of refilling used bottles.

Another object of the invention is to increase the sales area of manufacturers of flavored beverages by enabling them to use relatively light compact bulbs instead of heavy glass bottles, and thereby abolish the capital investment in bottles, boxes, trucks, and bottling and washing equipment.

Another object of the invention is to provide a bulb containing a predetermined quantity of flavoring material and compressed gas adapted to be injected into a predetermined volume of water to prepare a carbonic beverage properly charged and flavored.

Another object of the invention is to provide a bulb containing flavoring material and compressed gas adapted to expel completely all of the flavoring material.

A further object of the invention is to provide a method of charging soda siphons for accomplishing the above objects.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein—

Fig. 1 is a side elevational view of a siphon bottle adapted to be charged by a bulb containing gas and flavoring material;

Fig. 2 is an enlarged sectional view of a charging bulb illustrating a preferred embodiment of the invention;

Fig. 3 is a sectional view of a charging bulb illustrating another embodiment of the invention;

Fig. 4 is a sectional view taken on line 4—4 of Fig. 3;

Fig. 5 is a sectional view illustrating the bulb shown in Fig. 3 in operation;

Fig. 6 is a sectional view of a charging bulb illustrating a modification of the construction shown in Figs. 3, 4 and 5; and Fig. 7 is a sectional view of a charging bulb illustrating another embodiment of the invention.

Referring again to the drawing and more particularly to Figs. 1 and 2, there is shown a siphon bottle 1 having a charging head 2 provided with a threaded nipple 4 for receiving a threaded portion 5 of a holder 6 for a bulb or capsule 7 containing either compressed or liquified carbon dioxide adapted to charge the water within the bottle. The bulb preferably is substantially cylindrical and comprises a closed end 9, and a neck portion 10 having an opening 11 provided with a seat 12. To seal the bulb, a disc 14 formed of puncturable material such as soft metal and a gasket 15 formed of rubber or the like are seated within the neck opening and are forced against the seat by folding the end 16 of the neck portion inwardly. When the bulb holder 6 is screwed on the nipple 4, the sealing disc preferably is pierced by a pin 17 cooperating with a valve for admitting the contents of the bulb to the bottle and for preventing escape of gas (Fig. 2).

The present invention contemplates filling the bulb with gas for charging water, and also placing in the bulb a predetermined amount of flavoring and sweetening material, preferably a highly concentrated liquid essence, adapted to be mixed with the charged water to provide a flavored carbonic beverage. Any desired flavor can be used whereby all the different kinds of soda drinks which can be purchased in bottles or at soda fountains can be prepared in the siphon bottle.

In Fig. 2 a preferred embodiment is shown for carrying out the objects enumerated above, which comprises a bulb adapted to withstand pressures up to about one thousand pounds a square inch containing a predetermined quantity of flavoring material and compressed carbon dioxide adapted to be added to a predetermined volume of water to provide a beverage having the proper proportion of ingredients. This eliminates guesswork in measuring the essence and no utensils are used by the consumer which must be cleaned after charging the bottles. For example, the bulb preferably contains about one to two and one-half cubic centimeters of flavoring material, depending on the flavor chosen, comprising essence, sweetening and coloring and sufficient carbon dioxide, under a pressure of about nine hundred pounds a square inch, to charge about one quart of water. The bulbs may be of any suitable size to contain the required amount of flavoring fluid and gas and preferably are designed to be used with siphons now in use.

The above described bulb is particularly adapted to be used with a siphon bottle having the nipple 4 for the bulb holder extending upwardly and outwardly at an angle of about forty-five degrees so that the neck portion of the bulb faces downwardly and the flavoring fluid flows towards the opening. When the disc 14 is punctured, the compressed gas, in attempting to escape, forces the flavoring fluid out of the bulb and injects it into the water in the bottle. Since the gas is under a relatively high pressure, it completely expels the flavoring material from the bulb to prevent waste and to properly flavor the beverage. The gas also forces the flavoring material through the valve so rapidly that the valve is not contaminated by the flavoring material and does not have to be cleaned after each charging operation.

In Figs. 3, 4 and 5 another embodiment of the invention is illustrated, which comprises a bulb and a tube 19, preferably formed of metal or other suitable unbreakable material, bent upon itself to provide a substantially U-shaped siphon tube adapted to be mounted in the bulb. In order to secure the tube 19 to the bulb, the tube is provided with a flange 20 at one end thereof adapted to fit against the seat 12 in the neck opening, disc 14 is placed over the flanged end of the tube to close the tube and the gasket is compressed by folding the end of the neck inwardly. The other end 21 of the tube preferably is open and is adjacent the interior of the neck so that it is at the bottom of the liquid when the tube is in inverted or downwardly facing position.

In order to charge the bulb with gas, the seat 12 preferably is provided with spaced projections or ribs 22 (Fig. 3) adapted to prevent the flange from fitting too snugly on the seat during the charging operation and to provide a space for the gas to enter the bulb.

This bulb is particularly adapted to be used with flavoring materials which, when agitated, have a tendency to foam and would permit the gas to force itself through the fluid without ejecting the fluid. However, by providing the siphon tube, this contingency is eliminated since the gas must penetrate a head of fluid equivalent to the height of the fluid above the open end 21 of the tube and in addition the length of the tube. Usually, the fluid above the open end of the tube forms a good liquid seal to prevent the gas from escaping without ejecting the fluid, but if the fluid is foamy or has a tendency to be penetrated by compressed gas, the tube is fully capable of preventing the gas from escaping without first forcing out all of the fluid (Fig. 5).

In Fig. 6 a tube construction is shown adapted to be used in connection with siphon bottles provided with a nipple and a holder for attaching the tube in a downwardly and outwardly extending position whereby the fluid is at the bottom end of the bulb. To insure complete discharge of the flavoring fluid, a tube 25 is provided having its open end 26 in close proximity to the bottom wall of the bulb so that the liquid above the tube opening forms a seal to prevent the escape of gas before the liquid is forced through the tube.

Another modification of the invention is illustrated in Fig. 7 wherein the upper end of a tube 30 is provided with a puncturable portion 31 and the flavoring essence is placed in the tube and sealed therein by attaching a disc or cap 32 of inert rupturable material, such as gelatine or the like, to the lower end of the tube. When the portion 31 is pierced by the valve pin, the gas in the bulb breaks the rupturable member 32 and ejects the essence before it escapes from the tube.

In the event the capacity of the tube 30 is not sufficient to contain the flavoring material, only the essence is placed in the tube and the sweetening material is placed in the body of the bulb. Upon piercing the tube portion 31, the gas forces the sweetening solution against the rupturable member to break it and permit the essence, sweetening material and gas to be discharged. The rupturable member 32 may also be used in connection with the U-shaped tube shown in Figs. 3, 4 and 5.

Preferably, the bulbs are packed by placing a predetermined quantity of the desired flavoring material, for example ginger ale syrup, either in the bulbs or the tubes in communication with the neck of the bulb or in both. The bulbs are then charged with carbon dioxide and are sealed while under pressure by bending or folding the upper end 16 of the bulb inwardly to force the gasket and sealing disc or flange of the tube against the seat 12 to provide a secure seal. Thereafter, the bulbs may be labelled and placed in cartons to designate the flavor of the beverage adapted to be made therefrom.

When the consumer desires to use the bulbs, he fills the siphon bottle with a predetermined quantity of water, usually indicated by a mark 8 on the bottle, and secures the siphon head 2 to the mouth of the bottle. A bulb containing a selected flavor is then placed in the holder 6 and the holder is screwed on the nipple 4 so that the valve pin 17 pierces the soft metal disc 14 or puncturable portion 31 of the tube to release the contents of the bulb. When this occurs, the compressed gas, in attempting to escape, first forces the flavoring material or other liquid of the bulb into the siphon bottle and then flows into the bottle until the pressure in the bulb and bottle are equalized. The injection of the liquid flavoring under high pressure followed by the injection of the gas into the bottle, thoroughly mixes the contents. After the bulb is pierced, the flavoring material and gas, if not completely mixed with the water may be further agitated by vigorously shaking the bottle. Thus there is provided a flavored charged beverage having the proper proportion of ingredients. The consumer can dispense the beverage by pressing down the discharge valve handle 34 of the bottle in the customary manner (Fig. 1).

It will be seen that the present invention provides a simple, inexpensive method and apparatus for preparing flavored carbonic beverages for home use or the like. The bulbs, by being filled by the manufacturer, contain a measured quantity of flavoring material adapted to be mixed with a predetermined volume of water to provide a beverage of proper flavor and concentration without careful measuring or guess work on the part of the consumer. The bulbs can be readily made without the use of complicated machinery and can be provided at a slight increase in cost over the bulbs containing only carbon dioxide for making unflavored charged water. The bulbs are light in weight and can be readily shipped greater distances than bottled beverages. In this manner, the market of flavored drink manufacturers is greatly extended without expensive shipping costs and maintenance of a service for returning empty bottles. Also, the bulbs require little space and can be readily stored prior to being distributed to the consumer. The consumer is benefited because he can make his own flavored beverages at a substantial saving without the inconvenience of buying beverages in bottles, leaving a cash deposit, and returning the bottles to the stores. The retention of the flavoring in a tube within the capsule has the advantage of assuring the discharge of all of the flavoring into the siphon bottle. This is particularly important since the flavoring for use herein is preferably highly concentrated.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. An article of manufacture comprising a metallic bulb of the type used for charging soda siphons and the like having a puncturable sealed outlet, compressed gas and flavoring material in said bulb and a tube in said bulb having an open end at said outlet for conducting the gas and flavoring material to the outlet.

2. An article of manufacture comprising a metallic bulb of the type used for charging soda siphons and the like having a sealed outlet, compressed gas and flavoring fluid in said bulb, and a tube in said bulb having one end thereof in communication with the outlet and being bent upon itself with the other end thereof adjacent to the outlet end of said bulb.

3. An article of manufacture comprising a metallic bulb of the type used for charging soda siphons and the like having a sealed outlet, a tube within said bulb having one end thereof in communication with the outlet, a rupturable member closing the other end of said tube, flavoring material in said tube, and compressed gas in said bulb adapted to rupture said member and expel the flavoring material when the outlet is opened.

4. In a device of the class described, the combination of a metallic bulb of the type used for charging soda siphons and the like having an outlet, a tube adapted to extend into said bulb so that one end thereof is in communication with said outlet, said tube being bent upon itself with the other end thereof adjacent the end in communication with the outlet of said bulb to provide a siphon.

5. In a device of the class described, the combination of a metallic bulb of the type used for charging soda siphons and the like having an outlet, a tube adapted to extend into said bulb so that one end thereof is in communication with said outlet, and a rupturable member for sealing the other end of said tube adapted to be ruptured by compressed gas in the bulb when said outlet is opened.

6. In a device of the class described, the combination of a cartridge of the type used for charging soda siphons and the like, having an outlet and a seat within said outlet, a tube adapted to extend into said cartridge having a flange at one end thereof adapted to be supported by said seat, and a puncturable means extending over the flanged end of the tube and adapted to seal the cartridge.

7. In a device of the class described, the combination of a metallic bulb of the type for charging soda siphons and the like, having an outlet and a seat portion in said outlet, a tube extending into said bulb having a flange portion at one end thereof adapted to be placed on said seat, spaced projections on one of said portions adapted hold said portions out of sealing relation, a puncturable sealing disc for closing the end of the tube having the flange, compressed gas and flavoring material in said bulb, and a sealing gasket adapted to form a seal between said disc and said bulb at said outlet.

8. An article of manufacture comprising a metallic bulb adapted to contain compressed gas for charging soda siphons and the like having a sealed outlet provided with a portion adapted to be punctured, a compartment within said bulb adapted to receive a quantity of flavoring material, said compartment having one end thereof in communication with said outlet, and a rupturable member closing the other end of said compartment, said member being adapted to be ruptured by the pressure of the gas when said portion is punctured whereby the gas expels the flavoring material through said outlet.

9. In a device of the class described, the combination of a metallic bulb adapted to be filled with compressed gas for charging soda siphons and the like and having an outlet, a seat portion in said outlet, a tube extending into said bulb having a flange portion at one end thereof adapted to be placed on said seat portion, one of said portions having at least one projection for holding the flange portion in spaced relation with respect to said seat, and a puncturable sealing member fitting over the flanged end of the tube to seal the metallic bulb.

10. The method of preparing flavored carbonic beverages which method comprises confining and commingling a flavoring liquid and highly compressed charging gas whereby the compressed charging gas permeates and charges the flavoring liquid, thereafter utilizing the confined compressed gas for atomizing the flavoring liquid and forcing the atomized liquid into water to simultaneously charge the water and to disperse the flavoring liquid into the water, the gas escaping from the charged particles of the dispersed flavoring liquid further dispersing the same and causing the complete assimilation of the flavoring liquid by the water.

ELBERT F. CURRY.